United States Patent [19]

Tsubakimoto et al.

[11] Patent Number: 4,640,584
[45] Date of Patent: Feb. 3, 1987

[54] SPACERS FOR LIQUID CRYSTAL DISPLAY DEVICE

[75] Inventors: Tsuneo Tsubakimoto, Toyonaka; Iwao Fujikawa, Otsu; Mitsuo Kushino, Minoo, all of Japan

[73] Assignee: Nippon Shokubai Kagaku Kogyo Co., Ltd., Osaka, Japan

[21] Appl. No.: 714,903

[22] Filed: Mar. 22, 1985

[30] Foreign Application Priority Data

Mar. 24, 1984 [JP] Japan .................................. 59-55303

[51] Int. Cl.⁴ ............................................. G02F 1/13
[52] U.S. Cl. .................................................. 350/344
[58] Field of Search ................. 524/843; 350/343, 344

[56] References Cited

U.S. PATENT DOCUMENTS

| 3,945,980 | 3/1976 | Tsubakimoto et al. | 524/843 |
| 4,165,157 | 8/1979 | Kobale et al. | 350/343 |
| 4,283,119 | 8/1981 | Hofmann | 350/344 |
| 4,403,831 | 9/1983 | Amano | 350/344 |

FOREIGN PATENT DOCUMENTS 159243 12/1979 Japan .................................. 350/344

Primary Examiner—Donald A. Griffin
Attorney, Agent, or Firm—Omri M. Behr

[57] ABSTRACT

Spacers for a liquid crystal display device, which comprise fine spherical cured particles of amino resin obtained from formaldehyde and at least one amino compound selected from the group consisting of benzoguanamine, melamine and urea.

7 Claims, 2 Drawing Figures

SPACERS FOR LIQUID CRYSTAL DISPLAY DEVICE

BACKGROUND OF THE INVENTION

1. Field of the Invention:

This invention relates to spacers for a liquid crystal display device and more particularly to spacers for a liquid crystal display device which enable the opposed panels of the device to be held accurately at a fixed distance from each other.

2. Description of the Prior Art:

The liquid crystal display device is generally produced by interposing liquid crystal in a space formed with spacers between two vertically opposed transparent electrode substrates. The thickness of the layer of liquid crystal is controlled to a minute magnitude of the order of 10 microns. Since the electrooptical effect of the liquid crystal display device hinges heavily on the thickness of the liquid crystal layer, the function of the spacers for the liquid crystal display device which resides in controlling the thickness of the liquid crystal layer at the optimum value is important. Now that liquid crystal display are moving toward growth in size, the control of their liquid crystal layers in uniform thickness with high accuracy is becoming increasingly difficult and the possible dispersion of uniformity in thickness of their liquid crystal layer is increasingly liable to induce interference colors and uneven displays. Thus, materialization of means capable of keeping liquid crystal layers in liquid crystal display devices accurately in uniform thickness, namely enabling the vertically opposed two transparent electrode substrates in the devices to be kept separated accurately at a fixed distance from each other is a requisite indispensable to successful manufacture of liquid crystal display devices of high performance.

Heretofore, various materials have been tested for feasibility in spacers which serve to keep the vertically opposed two transparent electrode substrates of liquid crystal display devices at a fixed distance from each other. For example, spacers for liquid crystal display devices which are made of chopped glass fibers, metal oxides such as finely divided alumina particles, and thermoplastic resins such as spherical polystyrene particles have been developed. [Japanese Patent Laid-open Nos. SHO 57(1982)-70,522, SHO 57(1982)-210,323, SHO 56(1981)-40,809 and SHO 51(1976)-64,945.]

The conventional spacers, however, have been criticized as entailing various problems such as the difficulty encountered in keeping their liquid crystal layers uniform in thickness. In the case of spacers made of glass fibers, for example, there is the possibility that under the pressure exerted on the spacers when the vertically opposed two transparent electrode substrates are pressed against each other across the spacers during the manufacture of a liquid crystal display unit, the glass fibers of the spacers will be crushed and the spacers will consequently be deprived of their funtion. In the case of spacers made of metal oxide particles having high rigidity, the same pressure will possibly cause the particles to eat into the inner walls of the transparent electrode substrates and, in an extreme case, destroy the transparent electrodes formed on the substrates. In the case of spacers made of thermoplastic resin, when the thermoplastic resin is used as mixed in an adhesive sealing agent such as epoxy resin and polyimide resin or when it is subjected to a heat treatment for adhesion, there is the possibility that the spacers will be attacked by the adhesive agent or the heat and prevented from keeping the liquid crystal layer constant in thickness.

An object of the present invention is to provide novel spacers for a liquid crystal display device.

Another object of this invention is to provide spacers capable of keeping liquid crystal layer in a liquid crystal display device accurately in a uniform thickness.

SUMMARY OF THE INVENTION

The objects described above are attained by spacers for a liquid crystal display device, which comprise fine spherical cured particles of amino resin composed of formaldehyde and at least one amino compound selected from the group consisting of benzoguanamine, melamine and urea.

To be specific, in a liquid crystal display device having liquid crystal sealed in a space formed between two transparent electrode substrates, this invention concerns spacers for the liquid crystal display device which comprise fine spherical particles formed in a uniform diameter of insoluble, infusible cured amino resin and, therefore, enabled to keep the aforementioned space exactly at a uniform thickness.

EXPLANATION OF PREFERRED EMBODIMENTS

Figure 1:
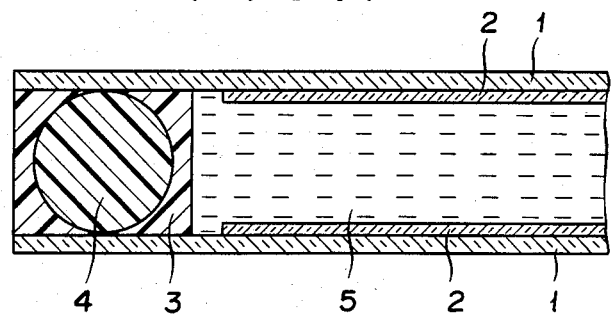
FIG. 1 is a cross sectional view illustrating a typical liquid crystal display device as an embodiment of this invention.

Now, an embodiment of the present invention will be described below with reference to the accompanying drawings. A liquid crystal display device constructed as illustrated in FIG. 1 is obtained by thoroughly mixing spacers 4 of this invention, namely fine spherical cured particles having a diameter equal to the thickness of a liquid crystal layer 5 desired to be formed in a proportion falling in the range of 1 to 10% by weight, preferably 2 to 8% by weight, with an adhesive sealing agent 3, applying the resultant mixture on the peripheral portion of one of two transparent substrates 1 provided with a transparent electrode 2 by means of screen printing, for example, pressing the other transparent substrate 1 similarly provided with a transparent electrode 2 against the applied layer of the mixture, keeping the opposed transparent substrates 1 pressed against each other with proper pressure and, at the same time, heating them at a temperature in the range of 50° to 300° C., preferably 100° to 150° C., for 10 to 90 minutes, preferably 30 to 60 minutes thereby thermally curing the adhesive sealing agent as deposited, and sealing liquid crystal in a space formed between the transparent electrodes 2 and 2.

Figure 2:
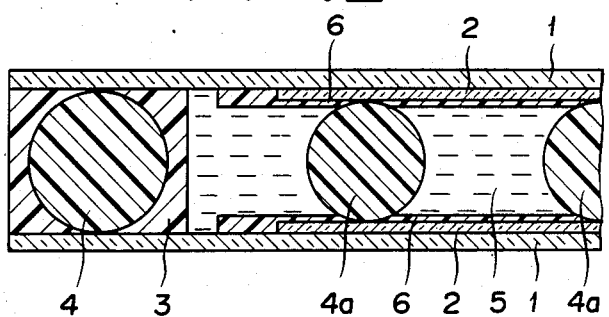
FIG. 2 is a cross sectional view illustrating another typical liquid crystal display device as another embodiment of this invention.

FIG. 2 illustrates another embodiment of this invention. A liquid crystal display device constructed as illustrated herein is obtained by dispersing minute spherical cured spacers 4a of this invention in a solvent or in a solution of a film-forming high molecular substance such as epoxy resin in a solvent, applying the resultant dispersion by means of the spinner method on one of two transparent substrates 1 provided with a transparent electrode 2, heating the layer of the dispersion as applied on the transparent substrate 1 thereby drying the high molecular substance into a film 6 and, at the same time, fastening the spacers 4a on the transparent substrate 1, subsequently applying a dispersion of other spacers 4 in an adhesive sealing agent 3 on the peripheral portion of the transparent substrate 1, combining the other transparent substrate 1 similarly provided with a transparent electrode 2, keeping the opposed transparent substrates 1 pressed against each other with proper pressure and, at the same time, heating them at a temperature in the range of 50° to 300° C., preferably 100° to 150° C., for 10 to 90 minutes, preferably 30 to 60 minutes thereby thermally curing the adhesive sealing agent as deposited, and sealing liquid crystal in a space formed between the transparent electrodes 2 and 2.

The fine spherical cured particles of amino resin to be used in the present invention are obtained from formaldehyde and at least one amino compound selected from the group consisting of benzoguanamine, melamine and urea. They are produced by any of the methods already proposed by us and proposed in this invention. These methods are, for example, represented by the following ones.

1. Fine spherical cured resin particles are obtained by a method which comprises causing benzoguanamine or a mixture of 100 to 50 parts by weight of benzoguanamine with 0 to 50 parts by weight of melamine to react with formaldehyde at a ratio of 1 mol of benzoguanamine or the mixture thereof to 1.2 to 3.5 mols of formaldehyde until the reaction product is rendered hydrophobic, then adding the reaction product into a stirred aqueous protective colloid solution thereby emulsifying the reaction product, polymerizing the emulsion in the presence of a curing catalyst added thereto, thereby forming a suspension of a fine spherical cured resin, separating the cured resin from the suspension, washing with water and drying the resin, and thereater crushing the same into fine spherical particles (U.S. Pat. No. 3,945,980).

These reactions are carried out at a pH in the range of 5 to 10 at a temperature in the range of 50° to 100° C. The curing of the reaction product in its emulsified state is effected by heating the emulsion in the presence of a curing catalyst added thereto at a temperature of 50° to 100° C. The curing catalyst can be suitably selected from a host of polymerization curing catalysts used for amino type resins. Examples of the catalyst include mineral acids such as hydrochloric acid, sulfuric acid and phosphoric acid, carboxylic acids such as benzoic acid, phthalic acid, acetic acid, propionic acid and salicylic acid, ammonium salts such as ammonium chloride and ammonium phosphate, benzene sulfonic acid, para-toluene sulfonic acid, dodecyl benzene sulfonic acid, and various other latent curing catalysts. Among other catalysts, sulfonic acids prove particularly desirable. The polymerization curing catalyst is effectively used in an amount of 0.01 to 5 parts by weight, preferably 0.2 to 2 parts by weight, based on 100 parts by weight of the reaction product.

2. The fine spherical cured resin particles are otherwise obtained by a method which comprises causing at least one amino compound selected from the group consisting of benzoguanamine, melamine and urea to react with formaldehyde at a ratio of 1 mol of the amino compound to 1.2 to 6.0 mols of formaldehyde, adding the reaction product into a stirred aqueous surface active agent solution thereby emulsifying the reaction product, polymerizing the emulsion in presence of a curing catalyst added thereto, thereby forming a suspension of a fine spherical cured resin, separating the cured resin from the suspension, water washing and drying the resin, and there after crushing the same into fine spherical particles.

These reactions are carried out at a pH in the range of 5 to 10 at a temperature in the range of 50° to 100° C. The curing of the reaction product in its emulsified state is effected by heating the emulsion in the presence of a curing catalyst added thereto at a temperature of 50° to 100° C. The curing catalyst can be suitably selected from a host of polymerization curing catalysts used for amino type resins. Examples of the catalyst include mineral acids such as hydrochloric acid, sulfuric acid and phosphoric acid, carboxylic acids such as benzoic acid, phthalic acid, acetic acid, propionic acid and salicylic acid, ammonium salts such as ammonium chloride and ammonium phosphate, benzene sulfonic acid, para-toluene sulfonic acid, dodecyl benzene sulfonic acid, and various other latent curing catalysts. Among other catalysts, sulfonic acids prove particularly desirable. The polymerization curing catalyst is effectively used in an amount of 0.01 to 20 parts by weight, preferably 0.2 to 10 parts by weight, based on 100 parts by weight of the reaciton product.

In accordance with any of the methods described above, insoluble, infusible fine spherical cured particles having a narrow particle distribution and having no surface irregularity are obtained. In order to obtain the uniform spherical cured particles having more narrow particle distribution, it is preferable to classify the particles by a method such as wet classification and pneumatic classification, if desired. By the method, the spherical cured particles can be easily prepared in a desired diameter. Generally for use as spacers for liquid crystal display devices, fine spherical cured particles having a diameter falling in the range of 1 to 15 μm, preferably 2 to 12 μm, can be obtained with accuracy of ±0.5 μm.

The fine spherical cured particles of amino resin obtained from formaldehyde and at least one amino compound selected from the group consisting of benzoguanamine, melamine and urea are insoluble and infusible and are capable of resisting the action of the adhesive sealing agent, retaining rigidity intact under harsh heat treatments, and withstanding various processing conditions. The fine spherical cured particles are tough so that when the vertically opposed two transparent electrode substrates are joined as pressed against each other across the cured particles, the cured particles are neither crushed nor caused to eat into the transparent electrode substrates. Thus, they permit a liquid crystal layer to be kept accurately in a uniform thickness. Particularly, the fine spherical cured particles of bezoguanamine-formaldehyde resin or benzoguanamine-melamine-formaldehyde resin, excellent in resistance to chemicals and solvents, and capable and very easy of production in a desired particle diameter and, thus, prove highly advantageous. Optionally, benzoguanamine, melamine and urea may be partially substituted by para-toluene sulfonamide. If this substituting compound is used in an excessive amount, it can go to degrade the resistance of the particles to solvent. Thus, the amount of this substituting compound must be carefully selected.

From the fine spherical cured particles of amino resin obtained from formaldehyde and at least one amino compound selected from the group consisting of benzoguanamine, melamine and urea as contemplated by this invention, the spacers in a liquid crystal display device are produced by a method which comprises dispersing the fine spherical cured particles in an adhesive sealing agent such as epoxy resin or polyimide resin, applying the resultant dispersion on the sealing portion of a given liquid crystal display device by means of screen printing, and thermally curing the dispersion or by a method which comprises dispersing the fine spherical cured particles in a solvent or in a solution of film-forming high molecular substance in a solvent, applying the resultant dispersion on a transparent electrode substrate, thermally drying the applied layer of the dispersion thereby converting the solution into a film and, at the same time, fastening the particles on the transparent electrode substrate and giving rise to spacers. This invention does not discriminate the spacers for liquid crystal display devices by the methods used for their production.

The adhesive sealing agent is used for keeping the liquid crystal display device sealed tightly and preventing moisture from entering the device and degradating the liquid crystal inside. It is an organic adhesive agent. Examples organic adhesive agent suitable for this purpose include thermosetting resin type adhesive agents, preferably epoxy type adhesive agents or polyimide resin.

Tin oxide, indium oxide or a mixture thereof can be used as the material for a transparent electrode. The transparent electrode is obtained by depositing this material on a glass substrate by vacuum deposition or by spattering. Indium oxide excels tin oxide in transmittance of light and electric resistance but is vulnerable to acids. In the case of a transparent electrode using indium oxide, therefore, due care should be given when the substrate is washed.

Examples of the liquid crystal material include nematic liquid crystals such as azomethine compounds, azo compounds, azoxy compounds, ester compounds and biphenyl compounds, smectic liquid crystals such as terephthal-bis-(4-n-butylaniline), 4,4'-azoxybenzoic acid di-ethylester, 4,4'-di-n-dodecyloxy-azoxybenzene, 4-para-substitutedbenzylidene-aminocinnamic ester compounds, chloesteric liquid crystals such as 3-methyl-2,6-bis-(4-methoxybenzylidene)-cyclohexanone, 2-(4-methoxybenzylidene)-6-(4-amyloyloxy-benzylidene)-cyclohexanone and heptyl-p-(methoxybenzylidene amino)-cinnamate, and mixed liquid crystals thereof. Desired sealing of such liquid crystal in the opposed panels can be accomplished by utilizing surface tension or pressure difference.

Now, the present invention will be described more specifically below with reference to working examples. It should be noted that the present invention is not limited by these working examples in any sense.

EXAMPLE 1

In a four-necked flask provided with a stirrer, a reflux condenser and a thermometer, 75 parts of (benzoguanamine, 75 parts of melamine, 290 parts of formalin (formaldehyde content 37%) and 1.16 part of an aqueous 10% sodium carbonate solution were mixed and the resultant mixture was adjusted to pH 8.0. This mixture was stirred and heated to 85° C. and held at this temperature for 1.5 hours to induce reaction and afford a soluble resinous solution having degree of water tolerance of 200%.

The expression "degree of water tolerance" (x), as used herein, is a measure which indicates the affinity for water of the foregoing soluble and fusible resin and can be determined in the following manner. In a test which comprises adding dropwise water to 2 grams of an aqueous reaction product of formaldehyde at least one amino compound selected from the group consisting of benzoguanamine, melamine and urea, while holding the temperature of the solution at 15° C., the amount of water ($W_1$ grams) required for causing the solution to become turbid is measured, and the degree of water tolerance (x) is then calculated as follows:

Degree of modified water tolerance $x = W_1/2 \times 100 (\%)$

On one hand, 7.5 parts of a nonionic surface active agent (Emulgen 430, product of Kao Chemical Kabushiki Kaisha, polyoxyethylene oleil ether) was dissolved in 2,455 parts of water and the resultant aqueous nonionic surface active agent solution was elevated to a temperature of 50° C. and stirred. The resinous solution having degree of modified water tolerance of 200% (at 15° C.) was poured into the aqueous nonionic active agent solution under stirring to obtain white suspension, and 90 parts of 5% aqueous dodecyl benzene sulfonic acid solution was poured into the suspension and it was maintained at a temperature of 50° to 60° C. for 3 hours, then it was diluted by adding 2,000 parts of cold water and was subjected to separation by sedimentation. Resin paste obtained by sedimentation separation was added into an 3,000 parts of aqueous solution dissolved 7.5 parts of Emulgen 430 and 4.5 parts of dodecyl benzene sulfonic acid, dispersed by using an ultrasonic disperser, and then elevated to a temperature of 90° C. under stirring and cured completely to obtain a suspension of fine cured resin particles. The fine cured resin particles were filtered from the suspension in vacuo, the resultant filter cake was dried in a hot air drier at a temperature of 150° C. for 4 hours to obtain 120 parts of a conglomerate of fine cured resin particles.

By disintegrating this conglomerate in a ball mill, there were obtained fine white cured resin particles. By a test with a particle size distribution tester (product of Coulter Electronics Inc. of the U.S., marketed under trademark designation of "Coulter Counter, Model TAII C1000"), the fine cured resin particles were found to be spheres $8.0 \pm 0.5$ μm in diameter. Further, it was found to be spheres $8.0 \pm 0.5$ μm in diameter by scanning electron microscope.

In various organic solvents including methanol, ethanol, butanol, ethyl acetate, butyl acetate, methyl cellosolve, ethyl cellosolve, acetone, methyl ketone, toluene and xylene, the fine cured resin particles showed absolutely no sign of swelling or solution. When the fine cured resin particles were heated to temperatures exceeding 250° C., they showed no discernible sign fusion or solution.

EXAMPLE 2

In the same four-necked flask as used in Example 1, 150 parts of benzoguanamine, 130 parts of formalin (formaldehyde content 37%) and 0.52 part of an aqueous 10% sodium carbonate solution were mixed and the resultant mixture was adjusted to pH 8.0. The mixture was stirred and heated to 95° C. and held at this temperature for four hours to induce reaction and obtain a soluble, fusible resin having degree of modified water tolerance of 100%.

The expression "degree of modified water tolerance" (Y), as used herein, is a measure which indicates the affinity for water of the foregoing soluble and fusible resin and can be determined in the following manner. In a test which comprises adding dropwise water to a solution in 5 grams of methanol of 2 grams of an aqueous reaction product of formaldehyde and at least one amino compound selected from the group consisting of benzoguanamine, melamine and urea, while holding the temperature of the solution at 25° C., the amount of water ($W_2$ grams) required for causing the solution to become turbid is measured, and the degree of modified water tolerance (Y) is then calculated as follows:

Degree of modified water tolerance $$Y = W_2/2 \times 100(\%)$$

Separately, 8 parts of partially saponified polyvinyl alcohol of polymerization degree of 500 (product of Kuraray Co., Ltd., marketed under trademark designation of Kuraray Poval 205) was dissolved in 750 parts of cold water. The aqueous solution was heated to 90° C. and stirred in a mixer (product of Tokushuki Kako Co., Ltd., marketed under trademark designation of "Homomixer" HU-M type) at a rotational speed of 3,000 rpm. By throwing the aforementioned soluble, fusible resin of degree of modified water tolerance of 100% into the aqueous Kuraray Poval 205 solution kept in a stirred state, there was obtained a white emulsion. The emulsion was cooled at 40° C. In an anchor type stirrer, the cooled emulsion and 2 parts of dodecylbenzene sulfonic acid added thereto were gentled stirred and held at 40° C. for two hours, then stirred for two hours each at 50° C., 60° C., and 90° C. to cure resin. Consequently, there was obtained a suspension of fine cured resin particles. Whole amount of the suspension was poured into 3,400 parts of water, homogenized, cooled to a room temperature and classification by natural sedimentation was repeated, fine cured resin particles classified from the suspension were filtered in vacuo and the resultant filter cake was washed with water. Whole amount of the filter cake was dried in a hot air drier at a temperature of 80° C. for 2 hours, and then heated at a temperature of 140° C. for 3 hours to obtain 50 parts of a conglomerate of the fine cured resin particles. With pressure of the degree obtained by slight push with finger tips, this conglomerate was disintegrated to afford fine white cured resin particles. By a test under a scanning electron microscope, these fine cured resin particles were found to be spheres 10±0.5 μm in diameter.

In various organic solvents including methanol, ethanol, isopropyl alcohol, butanol, ethyl acetate, butyl acetate, methyl cellosolve, ethyl cellosolve, acetone, methylethyl ketone, toluene, and xylene, these fine cured resin particles showed absolutely no sign of swelling or solution. When the fine cured resin particles were heated to temperatures exceeding 250° C., they showed no discernible sign of fusion or solution.

EXAMPLE 3

In the same four-necked flask as used in Example 1, 150 parts of meramine, 290 parts of formalin (formaldehyde content 37%) and 1.16 part of an aqueous 10% sodium carbonate solution were mixed and the resultant mixture was adjusted pH 8.0. This mixture was stirred and heated to 70° C. and held at this temperature for one hour to induce reaction and afford a soluble resinous solution having degree of water tolerance of 180%.

On one hand, 12 parts of an anionic surface active agent (Neopellex 05 powder, product of Kao Chemical Kabushki Kaisha, sodium dodecyl benzene sulfonate) was dissovled in 2,241 parts of water and the resultant aqueous anionic surface active agent solution was elevated to a temperature of 40° C. and stirred. The resinous solution having degree of water tolerance of 180% was poured into the aqueous anionic active agent solution under stirring and the 30 parts of 10% of an aqueous solution of dodecyl benzene sulfonic acid was added to obtain white suspension. The suspension was maintained at a temperature of 40° C. for 1 hour, then elevated up to a temperature of 90° C. at a rate of 10° C./hr and cured to obtain a suspension of fine cured resin particle.

Whole amount of the suspension of the fine cured resin particles was poured into 2,800 parts of water, homogenized, then cooled to a room temperature and classification was repeated by the same method as Example 2. Fine cured resin particles were separated by centrifuge from the suspension of classified fine cured resin particles. Whole amount of a paste of fine cured resin particles obtained by centrifugal separation was dispersed into 1,000 parts of 0.1 N of aqueous hydrochloric acid solution, washed by ultrasonics and separated by centrifuge. Such operation was repeated for three times, then whole amount of the fine cured resin paste was dispersed into 1,000 parts of water, washed by ultrasonics and separated by centrifuge. Such operation was repeated for two times. Whole amount of fine cured resin particle paste after washing was dried in a hot air drier at a temperature of 160° C. for two hours to obtain 80 parts of a conglomerate of fine cured resin particles. With pressure of the degree obtained by slight push with finger tips, this conglomerate was disintegrated to afford fine white cured resin particles. By a test under a scanning electron microscope, these fine cured resin particles were found to be spheres 3.0±0.5 μm in diameter.

In various organic solvents including methanol, ethanol, isopropyl alcohol, butanol, ethyl acetate, butyl acetate, methyl cellosolve, ethyl cellosolve, acetone, methylethyl ketone, toluene, and xylene, these fine cured resin particles showed absolutely no sign of swelling or solution. When the fine cured resion particles were heated to temperatures exceeding 250° C., they showed no discernible sign of fusion or solution.

EXAMPLE 4

In the same four-necked flask as used in Example 1, 120 parts of benzoguanamine, 30 parts of urea, 266 parts of formalin (formaldehyde content 37%) and 1.1 parts of an aqueous 10% sodium carbonate solution were mixed. The resultant mixture was adjusted to pH 8.0. This mixture was stirred and held at 85° C. for three hours to induce reaction and afford a soluble, fusible resin having degree of modified water tolerance of 150%. Separately, 8.5 parts of completely saponified polyvinyl alcohol of polymerization degree of 1,700 (product of Kuraray Co., Ltd., marketed under trademark designation of "Kuraray Poval 117") was dissolved in 500 parts of cold water. This aqueous solution was heated to 80° C. and stirred in the same mixer as used in Example 2 at a rotational speed of 3,000 rpm. By throwing the aforementioned soluble, fusible resin of degree of modified water tolerance of 150% into the aqueous Kuraray Poval 117 solution kept in a stirred state, there was obtained a white emulsion. This emulsion was cooled to 40° C. The cooled emulsion and 3 parts of dodecylbenzene sulfonic acid added thereto were gently stirred in the anchor type stirrer and held at 50° C. for 1.5 hours. It was then held for two hours each at 60° C., 70° C., and 90° C. to obtain a suspension of fine cured resin particles. Whole amount of the suspension was poured into 4,600 parts of water, homogenized, cooled to a room temperature and classified by the same method as Example 2 repeatedly. The classified fine cured resin particles were filtered from the suspension in vacuo and the resultant filter cake was washed with water. Whole amount of filter cake was dried in a hot air drier at a temperature of 80° C. for two hours, heated at a temperature of 150° C. for three hours to obtain 75 parts of conglomerate of fine cured resin particles. With pressure of the degree obtainable by slight push with finger tips, this conglomerate was disintegrated to afford fine white cured resin particles. By a test under a scanning electron microscope, these fine white cured resin particles were found to be spheres 6.5±0.5 μm in diameter.

In the same organic solvents as used in Examples 1, the fine cured resin particles showed absolutely no sign of swelling or solution. When the fine cured resin particles were heated to temperatures exceeding 250° C., they showed no discernible sign of fusion or solution.

EXAMPLE 5

Now a working example of the liquid crystal display device will be described with reference to FIG. 1.

Spacers 4, namely fine cured spherical particles of Example 1 produced in a diameter equal to a thickness which a liquid crystal layer in the device aimed at is desired to possess were thoroughly mixed in a proportion in the range of 1 to 10% by weight in epoxy resin 3 as an adhesive sealing agent. The resultant mixture was applied on one of transparent substrates 1 provided with a transparent electrode 2 by means of screen printing. The remaining transpatent substrate 1 was superposed on the applied layer of the mixture. The resultant composite was held under suitable pressure and heated at a temperature of 100° to 150° C. for 30 to 60 minutes to cure the mixture. Then liquid crystal 5 was poured into the spaced formed by the spacers between the opposed transparent substrates to obtain a liquid crystal display device.

The spacers of this invention thus used in the liquid crystal display device were not corroded by the epoxy resin used as the adhesive sealing agent, not softened when cured by heating, and not crushed under application of pressure. They served to keep the space between the transparent substrate accurately in a fixed thickness.

The example represents the present invention embodies advantageously particularly in a small liquid crystal display device.

EXAMPLE 6

Now, another working example of the liquid crystal display device using the spacers of this invention will be described below with reference to FIG. 2.

Spacers 4a, namely fine cured spherical particles of Example 2 were dispersed in a solution of a film-forming high molecular substance such as epoxy resin in a solvent. The resultant dispersion was applied on one of two transparent substrates 1 provided with a transparent electrode 2 by means of screen printing. The layer of the dispersion as applied on the transparent substrate 1 was thermally dried to convert the solution of high molecular substance into a film 6 and, at the same time, fasten the spacers 4a on the transparent substrate 1. Thereafter, spacers 4 were dispersed in epoxy resin as an adhesive sealing agent 3. The resultant dispersion was applied on the peripheral portion of the transparent substrate 1. The two transparent substrates were combined and held under proper pressure at a temperature of 100° to 150° C. for 30 to 60 minutes to cure the dispersion. Then, liquid crystal was poured into a space formed by the spacers between the opposed transparent substrates to afford a liquid crystal display device.

The spacers of this invention thus used in the liquid crystal display device were not corroded by either the epoxy resin as the adhesive sealing agent or the high molecular substance, not softened when heated, or not crushed or caused to eat into the transparent substrates under applied pressure. They served to keep the space between the transparent substrates accurately at a uniform thickness.

In this example, the spacers controlled the space not merely in the sealed portion of the liquid crystal display device but also in the entire area of the transparent substrates. Thus, this example represents the invention embodies advantageously particularly in a large liquid crystal display device.

What is claimed is:

1. A liquid crystal display device, comprising two transparent substrates each provided on the inner side thereof with a transparent electrode, liquid crystal sealed in a space formed between said two transparent substrates, and fine spherical cured particles formed of amino resin obtained from formaldehyde and at least one amino compound selected from the group consisting of benzoguanamine, melamine and urea, and disposed at least in the inner peripheral portion of said two transparent substrates as mixed with an adhesive sealing agent.

2. A liquid crystal display device according to claim 1, wherein said amino resin is benzoguanamine-formaldehyde resin or benzoguanamine-melamine-formaldehyde resin.

3. A liquid crystal display device according to claim 1, wherein said fine spherical particles have an average particle diameter in the range of 1 to 15 μm.

4. A liquid crystal display device according to claim 3, wherein said amino resin is benzoguanamine-melamine-formaldehyde resin.

5. A liquid crystal display device according to claim 1, wherein said adhesive sealing agent is a thermosetting type resin adhesive agent.

6. A liquid crystal display device according to claim 1, wherein said thermosetting resin type adhesive agent is an epoxy resin type adhesive agent.

7. A liquid crystal display device according to claim 1, which further comprises fine spherical cured particles disposed between said two transparent substrates other than in said peripheral portion.

* * * * *